United States Patent Office 3,423,399
Patented Jan. 21, 1969

3,423,399
METHOD FOR THE PRODUCTION OF
5'-RIBONUCLEOTIDE
Mikio Honjo, Takatsuki, Toru Masuda, Nishinomiya, Kinichi Imai, Takatsuki, Shoichiro Fujii, Kyoto, and Kunio Takanohashi, Suita, Japan, assignors to Takeda Chemical Industries, Ltd., Osaka, Japan
No Drawing. Filed June 9, 1966, Ser. No. 556,281
U.S. Cl. 260—211.5    17 Claims
Int. Cl. C08 6/1900

ABSTRACT OF THE DISCLOSURE

Without protecting the hydroxy groups at the 2'- and 3'-positions, 5'-ribonucleotides are prepared in good yields in the presence of a phenol directly from the corresponding ribonucleosides.

---

This invention is concerned with a method for the production of 5'-ribonucleotide, which comprises reacting the corresponding ribonucleoside with a specific phosphorylating agent in the presence of phenol, followed by subjecting the resultant product to hydrolysis.

A ribonucleoside has three hydroxy groups (at the 2'- 3'- and 5'-positions) on its ribose moiety, and when the ribonucleoside is directly subjected to phosphorylation, a mixture of ribonucleoside-2', 5'-diphosphate and 3'- 5'-diphosphate is produced.

Therefore, in order to selectively produce 5'-ribonucleotide from the corresponding ribonucleoside, it has been necesssary to protect the hydroxy groups at 2'- and 3'-position with certain suitable substituents prior to effecting phosphorylation at the 5'-position.

Thus, the hitherto-known methods for the production of 5'-ribonucleotide starting with the corresponding ribonucleoside consists of protecting the 2'- and 3'-hydroxy groups on the ribose moiety with acyl groups (e.g. acetyl, benzoyl radicals, etc.) or the isopropylidene group, subsequently phosphorylating the free 5'-hydroxy group by an appropriate agent, and then removing the protecting groups.

However, the hitherto-known methods are not advantageously applicable to the preparation of 5'-ribonucleotide from the corresponding ribonucleoside on a commercial scale because they require many troublesome steps, especially that of removing the protecting groups; groups and that of removing the protecting groups; moreover, the yield of the product is low.

It is an object of the present invention to provide a novel and industrially feasible method for the production of 5'-ribonucleotide from the corresponding ribonucleoside.

It is also an object of the invention to prepare 5'-ribonucleotide from the corresponding ribonucleoside in a good yield by simple procedure and without the necessity of protecting the hydroxy groups at the 2'- and 3'-positions.

These objects are realized by the present invention on the basis of the unexpected finding that only the OH group at the 5'-position of the ribonucleoside is selectively phosphorylated without requiring protection of the hydroxyl groups at the 2'- and 3'-positions prior to the phosphorylation, by reacting the ribonucleoside with a phosphorylating agent in the presence of phenol, followed by subjecting the resultant product to hydrolysis.

The present method for the production of 5'-ribonucleotide is thus an industrially feasible method, since it does not involve such troublesome procedures as protection of 2'- and 3'-OH groups and removal of the protecting groups, and easily affords the desired 5'-ribonucleotide in a good yield.

As stated above, the present invention comprises reacting ribonucleoside with a phosphorylating agent in the presence of phenol.

The ribonucleotides in the present invention are exemplified by those containing a purine base (e.g. adenine, hypoxanthine, guanine, etc.), those containing a pyrimidine base (e.g. cytosine, uracil, thymine, etc.) and those containing a pyridine base (e.g. nicotinamide, etc.), regardless of whether such ribonucleotides are naturally-occurring or synthetic.

The phenols used in the present invention can be exemplified by monophenols such as phenol, naphthol, o-chlorophenol, 2,6-dichlorophenol, 2,3,6-trimethylphenol, thymol, cresols (ortho-, meta- and para-cresol and mixtures thereof), the various xylenols, and by polyphenols such as catechol, resorcinol, phloroglucinol, etc.

These phenols can be successfully employed singly or in various combinations.

Among the phenols, monophenols are particularly suitable, and especially, phenol, o-chlorophenol, cresol (o-, m-, p-cresol or mixtures thereof) and m-xylenol give best results.

The phosphorylating agents in the present method comprise, for example, phosphorus trichloride, phosphorus oxychloride, phosphorus pentachloride, pyrophosphoryl tetrachloride, hydrolyzed phosporus oxychloride, hydrolyzed phosphorus pentachloride or hydrolyzed phosphorus trichloride which are prepared by mixing water and posphorus compound, or alcoholyzed phosphorus oxychloride, alcoholyzed phosphorus pentachloride or alcoholyzed phosphorus trichloride, which are prepared by mixing a lower alcohol having 1 to 4 carbon atoms (e.g. methyl alcohol, ethyl alcohol, propyl alcohol, isopropyl alcohol, butyl alcohol, teritiary butyl alcohol) with phosphorus compound.

Among these phosphorylating agents, pyrophosphoryl tetrachloride, phosphorus ovychloride, hydrolyzed or alcoholyzed phosphorus oxychloride give best results. These agents can be successfully employed singly or in combination.

The present method is carried out by adding the phosphorylating agent to the ribonucleoside, dissolved or suspended in the pheonl(s), to allow phosphorylation to take place, and then hydrolyzing the resultant product.

The above-mentioned ribonucleoside, phenols or phosphorylating agents need not be in a pure state.

The amount of phenols and phosphorylating agents used varies with the kind or ribonucleoside, phenols or phosphorylating agents. Generally, the amount of phosphorylating agent is from about 1 to about 30 moles, optimally about 2 to about 15 moles, relative to the ribonucleoside. The phenols are employed in an amount of not less than about 10 moles relative to the ribonucleoside, and generally are employed in an amount ranging from about 10 to about 100, optimally from about 15 to about 50 moles per one mole of the ribonucleside.

The reaction easily proceeds at room temperature (about 15° to about 30° C.), and if desired may be carried out with heating or cooling.

As the phenol can act as solvent, no reaction solvent is required, but a suitable solvent (e.g. benzene, xylene, dioxane, etc.) can be used together with phenol, as long as it does not inhibit the reaction. Especially, by using benzene as the solvent together with phenol, a saving in amount of phenol employed can be realized.

In this way, only the 5'-OH group of the ribonucleoside is selectively phosphorylated to give the desired 5'-ribonucleotide. The thus-obtained product is then subjected to hydolysis.

The hydrolysis is carried out, for example, by pouring the resultant reaction mixture into water, preferably cooled water, or by adjusting the pH value of the reaction mixture obtained in the first step to the weakly acid area, desirably to about 1 to about 2 by adding an alkaline material (e.g. sodium hydroxide, potassium hydroxide, sodium carbonate, potassium carbonate, etc.). Thus, the desired 5'-ribonucleotide is produced.

As detailed above, by the present invention, 5'-ribonucleotide can be easily obtained in a short period of time by a simple process and under very moderate conditions as compared with those of prior methods.

Moreover, the 5'-ribonucleotide is obtained in high purity and good yield.

For the purpose of giving those skilled in the art a better understanding of the invention, the following examples of presently preferred embodiments are given. In these examples, parts by weight bear the same relation to parts by volume as do grams to milliliters.

EXAMPLE 1

To 196 parts by weight of inosine suspended in 3.8 parts by volume of meta-cresol (m-cresol) was added 380 parts by weight of pyrophosphoryl tetrachloride at 100° C. The mixture was left standing under stirring at the same temperature for 2.5 hours.

The reaction mixture was poured into 13,600 parts by volume of ice water and the whole mixture was shaken with 2000 parts by volume of benzene to transfer the m-cresol into the benzene layer.

The benzene layer was washed twice with 4500 parts by volume of water. The aqueous layer combined with the washings was shaken with benzene. Then aqueous layer was separated and adjusted to pH 1 with 5 N aqueous solution of sodium hydroxide.

[Analysis of so-adjusted solution by means of paper electrophoresis (borate buffer, pH 9.2) showed that inosine - 5' - monophosphate was produced in quantitative yield.]

The solution was diluted with water to a total volume of 5000 parts by volume and was then adsorbed on a column packed with 2000 parts by weight of activated charcoal. The column was washed with water and eluted with an 0.7% aqueous solution of sodium hydroxide. The eluate was adjusted to pH 8.6, and concentrated to give 240 parts by weight of crystals of disodium salt of inosine-5' - monophosphate (calculated as anhydride). Yield 83.5%.

EXAMPLE 2

A mixture of 600 parts by volume of m-cresol and 2.7 parts by weight of inosine was stirred for one hour at 40–50° C. to give a homogeneous solution.

After the solution was cooled to 5° C., 20 parts by volume of pyrophosphoryl tetrachloride were added and the mixture stirred for 2 hours. The reaction mixture was treated as in Example 1 to give 3.3 parts by weight of crystals of disodium salt of inosine - 5' - monophosphate (calculated as anhydride). Yield 85%.

When the above-obtained product was analyzed by means of paper electrophoresis [(1) borate buffer, pH 9.2; (2) citrate buffer, pH 5.8] and paper chromatography (ascending method using (1) isobutyric acid:0.5 normal aqueous ammonia=10:6 by volume and (2) saturated ammonium sulfate:isopropanol:water=79:2:19 by volume), the migration distance and the Rf value were identified with those of inosine-5'-monophosphate. Periodic acid benzene reaction of the product was positive, and the product was completely dephosphorylated by 5'-nucleotidase of bull semen.

EXAMPLE 3

To 3.9 parts by weight of adenosine suspended in 76 parts by volume of m-cresol was added 7.6 parts by weight of pyrophosphoryl tetrachloride at 10° C. The mixture was stirred at the same temperature for 2 hours.

The reaction mixture was treated as in Example 1 to give 4.3 parts by weight of crystals of disodium salt of adenosine-5'-monophosphate (calculated as anhydride). Yield 75%.

EXAMPLE 4

To 3.9 parts by weight of inosine suspended in 76 parts by volume of m-cresol, were added 13.8 parts by weight of crude pyrophosphoryl tetrachloride containing 55 weight percent of pyrophosphoryl tetrachloride and 45 weight percent of phosphorus oxychloride at 10° C.

The mixture was stirred under the same temperature for 2 hours.

The reaction mixture was treated as in Example 1 to give 4.8 parts by weight of crystals of disodium salt of inosine-5'-monophosphate (calculated as anhydride). Yield 84%.

EXAMPLE 5

To 1.9 parts by weight of inosine suspended in 56 parts by volume of phenols (phenol 31 weight percent, o-cresol 12 weight percent, m,p-cresol 38 weight percent, xylenol 19 weight percent), were added 5.6 parts by weight of pyrophosphoryl tetrachloride at 10° C. The mixture was stirred under the same temperature for 2 hours. The reaction mixture was treated as in Example 1 to give 2.35 parts by weight of crystals of disodium salt of inosine-5'-monophosphate (calculated as anhydride). Yield 85%.

EXAMPLE 6

To 1.97 parts by weight of guanosine suspended in 36 parts by volume of m-cresol, were added 5.4 parts by weight of pyrophosphoryl tetrachloride at 10° C. The mixture was stirred under the same temperature for 4 hours. The reaction mixture was treated as in Example 1 to give 2.0 parts by weight of crystals of disodium salt of guanosine-5'-monophosphate (calculated as anhydride). Yield 70%.

EXAMPLE 7

To 600 parts by volume of orthochlorophenol were added 2.7 parts by weight of inosine.

The mixture was stirred at 40° C. for 0.5 hour. After the solution was cooled to 5° C., 20 parts by volume of pyrophosphoryl tetrachloride were added and the mixture stirred for 2 hours. The reaction mixture was treated as in Example 1 to give 3.3 parts by weight of crystals of disodium salt of inosine-5'-monophosphate (calculated as anhydride). Yield 85%.

EXAMPLE 8

To a solution of 4.9 parts by weight of uridine in 210 parts by volume of m-cresol, were added 7 parts by volume of pyrophosphoryl tetrachloride at 5° C. The mixture was stirred under the same temperature for 2 hours. The reaction mixture was treated as in Example 1 to give 5.9 parts by weight of crystals of uridine-5'-monophosphate (calculated as anhydride). Yield 80%.

The ultraviolet absorption ratios (water) of 290 m$\mu$/260 m$\mu$, 280 m$\mu$/260 m$\mu$ and 250 m$\mu$/260 m$\mu$ of the product were determined as 0.04, 0.38 and 0.74, respectively. The product was completely dephosphorylated by 5'-nucleotidase of bull semen.

EXAMPLE 9

To a solution of 3.4 parts by weight of cytidine in 300 parts by volume of m-cresol, were added 10 parts by volume of pyrophosphoryl tetrachloride at 5° C. The mixture was stirred under the same temperature for 2 hours to allow a reaction to take place, followed by treating as in Example 1 to give 4.5 parts by weight of crystals of disodium salt of cytidine-5'-monophosphate (calculated as anhydride). Yield 87%.

The product was completely dephosphorylated by 5'-nucleotidase from bull semen.

EXAMPLE 10

0.98 part by weight of inosine was suspended at 25° C. in a mixture of 10 parts by weight of dioxane and 20 parts by weight of meta-xylenol (m-xylenol).

When 3.8 parts by weight of pyrophosphoryl tetrachloride were added dropwise thereto, the inosine dissolved to give a homogeneous solution. The mixture was kept under a temperature of 25° C. to allow a reaction to take place.

The reaction mixture was treated as in Example 1 to give 1.2 parts by weight of crystals of disodium salt of inosine-5'-monophosphate (calculated as anhydride). Yield 83.8%.

EXAMPLE 11

0.98 part by weight of inosine was suspended at 25° C. in a mixture of 10 parts by weight of benzene and 20 parts by weight of m-xylenol. When 3.8 parts by weight of pyrophosphoryl tetrachloride were added dropwise thereto, the inosine dissolved to give a homogeneous solution. The solution was stirred under the temperature of 25° C. to allow a reaction to take place. The reaction mixture was treated as in Example 1 to give 1.18 parts by weight of crystals of disodium salt of inosine-5'-monophosphate (calculated as anhydride). Yield 82.5%.

EXAMPLE 12

3.8 parts by weight of pyrophosphoryl tetrachloride were exothermically dissolved in 20 parts by weight of phenol. After the solution was cooled to 30° C., 0.98 part by weight of inosine was added thereto and the mixture was stirred under the same temperature for 0.5 hour to allow a reaction to take place. The reaction mixture was treated as in Example 1 to give 1.12 parts by weight of crystals of disodium salt of inosine-5'-monophosphate (calculated as anhydride). Yield 78.3%.

EXAMPLE 13

17 parts by weight of phosphorus oxychloride was mixed with 17 parts by weight of xylene, followed by cooling, and 1 part by weight of water was added thereto under stirring.

The mixture was heated at 90–95° C. for 5 hours with stirring. After the mixture was dissolved in 20 parts by weight of phenol, 1.96 parts by weight of inosine was added thereto to allow a reaction to take place for 2 hours.

The reaction mixture was treated as in Example 1 to give 2.38 parts by weight of crystals of disodium salt of inosine-5'-monophosphate (calculated as anhydride). Yield 83.1%.

EXAMPLE 14

0.98 part by weight of inosine was suspended in a mixture of 5 parts by weight of benzene and 10 parts by weight of phenol. When 3.8 parts by weight of pyrophosphoryl tetrachloride were added thereto at 20° C., the inosine dissolved to give a homogeneous solution.

The mixture was kept under the same temperature to allow a reaction to take place for 1 hour. The reaction mixture was treated as in Example 1 to give 1.21 parts by weight of crystals of disodium salt of inosine-5'-monophosphate (calculated as anhydride). Yield 84.5%.

EXAMPLE 15

To 2 parts by weight of inosine suspended in a mixture of 20 parts by weight of m-cresol and 12 parts by weight of benzene, were added 2.8 parts by weight of pyrophosphoryl tetrachloride at 10° C.

The mixture was kept under the same temperature for 4 hours to allow a reaction to take place. The reaction mixture was treated as in Example 1 to give 2.4 parts by weight of inosine-5'-monophosphate (calculated as anhydride). Yield 82.2%.

EXAMPLE 16

To 1.35 parts by weight of inosine suspended in 150 parts by volume of m-cresol, were added 5 parts by volume of phosphorus oxychloride at 0–5° C. After the mixture was kept under the same temperature for 5 hours to allow a reaction to take place, it was subsequently treated as in Example 1. Analysis of the product by means of paper electrophoresis (borate buffer, pH 9.2) showed that inosine-5'-monophosphate was selectively produced.

EXAMPLE 17

To a suspension of 1.35 parts by weight of inosine in 150 parts by volume of m-cresol, were added at 0–5° C., 5 parts by volume of a mixture consisting of 40 volume parts of phosphorus oxychloride and 0.1 volume part of water. After the mixture was kept under the same temperature for 5 hours to allow a reaction to take place, it was subsequently treated as Example 1. Analysis of the product by means of paper electrophoresis (borate buffer, pH 9.2) showed that inosine-5'-monophosphate was selectively produced.

EXAMPLE 18

To 0.530 part by weight of inosine suspended in 7.5 parts by volume of m-cresol was added alcoholyzed phosphorus oxychloride prepared by mixing 4.5 parts by volume of phosphorus oxychloride and 0.2 part by volume of tertiary butyl alcohol. The mixture was stirred at 5° C. for 16 hours.

The reaction mixture was poured into 100 parts by volume of ether to give white crystals which were then collected and poured into ice water to be hydrolyzed.

[Analysis of the hydrolyzate by means of paper electrophoresis, showed that inosine-5'-monophosphate was produced in a yield of 87%.]

The hydrolyzed solution was adjusted to pH 7.5 to 8 and concentrated to 4 parts by volume. To the thus-treated concentrate was added 4 parts by volume of methanol to give 0.795 part by weight of crystals of disodium salt of inosine-5'-monophosphate (calculated as anhydride). Yield 83%.

EXAMPLE 19

To 0.530 part by weight of inosine suspended in 7.5 parts by volume of m-cresol was added hydrolyzed phosphorus oxychloride prepared by mixing 4.5 parts by volume of phosphorus oxychloride and 0.01 part by volume of water.

The mixture was stirred at 5° C. for 12 hours.

The reaction mixture was poured into 100 parts by volume of ether to give white crystals, which were then collected and poured into ice water to be hydrolyzed.

[Analysis of the hydrolyzate by means of paper electrophoresis (borate buffer, pH 9.2) showed that inosine-5'-monophosphate was produced in a yield of 85%.]

The hydrolyzed solution was treated as in Example 18 to give 0.630 part by weight of disodium salt of inosine-5'-monophosphate (calculated as anhydride). Yield 80%.

EXAMPLE 20

To 0.560 part by weight of guanosine suspended in 7.5 parts by volume of m-cresol was added alcoholyzed phosphorus oxychloride prepared by mixing 4.5 parts by volume of phosphorus oxychloride and 0.2 part by volume of tertiary butyl alcohol. The mixture was stirred at 5–10° C. for 8 hours. The reaction mixture was poured into 100 parts by volume of ether to give white crystals, which were then collected and poured into ice water to be hydrolyzed.

[Analysis of the hydrolyzate by means of paper electrophoresis showed that guanosine-5'-monophosphate was produced in a yield of 81%.]

The hydrolyzed solution was treated as in Example 18 to give 0.610 part by weight of disodium salt of guanosine-5'-monophosphate (calculated as anhydride). Yield 65%.

EXAMPLE 21

To 0.530 part by weight of adenosine suspended in 7.5 parts by volume of m-cresol was added alcoholyzed phosphorus oxychloride prepared by mixing 4.5 parts by volume of phosphorus oxychloride and 0.2 part by volume of tertiary butyl alcohol. The mixture was stirred at 5° C. for 16 hours.

The reaction mixture was poured into 100 milliliters of ether to give white crystals, which were then collected and poured into ice water to be hydrolyzed.

[Analysis of the hydrolyzate by means of paper electrophoresis, showed that adenosine-5'-monophosphate was produced in a yield of 94%.]

The hydrolyzed solution was adjusted to pH 1.5 to 2 and concentrated to 3 parts by volume. To the thus-treated concentrate was added 9 parts by volume of methanol to give 0.630 part by weight of disodium salt of adenosine-5'-monophosphate (calculated as anhydride). Yield 87.5%.

EXAMPLE 22

To 0.534 part by weight of adenosine suspended in 7.5 parts by volume of m-cresol was added hydrolyzed phosphorus oxychloride prepared by mixing 4.5 parts by volume of phosphorus oxychloride and 0.02 part by volume of water. The mixture was stirred at 5–10° C. for 8 hours.

The reaction mixture was poured into 100 parts by volume of ether to give white crystals which were then collected and poured into ice water to be hydrolyzed.

[Analysis of the hydrolyzate by means of paper electrophoresis showed that adenosine-5'-monophosphate was produced in a yield of 83%.]

The hydrolyzed solution was adjusted to pH 1.5 to 2 and concentrated to 2 parts by volume. To the thus-treated concentrate was added 8 parts by volume of methanol or 8 parts by volume of acetone to give 0.510 part by weight of crystals of adenosine-5'-monophosphate (calculated as anhydride). Yield 66%.

Having thus disclosed the invention, what is claimed is:

1. In a method for producing 5'-ribonucleotide from the corresponding ribonucleoside, the improvement which comprises reacting the hydroxy-unprotected ribonucleoside with a phosphorylating agent in the presence of phenol, the molar proportion of phenol to ribonucleoside being about 10 to about 100 and hydrolyzing the resulting product.

2. The method as claimed in claim 1, wherein the molar proportion of phenol to ribonucleoside is about 15 to about 50.

3. The method as claimed in claim 1, wherein the ribonucleoside is insoine.

4. The method as claimed in claim 1, wherein the ribonucleoside is guanosine.

5. The method as claimed in claim 1, wherein the ribonucleoside is adenosine.

6. The method as claimed in claim 1, wherein the ribonucleoside is cytidine.

7. The method as claimed in claim 1, wherein the ribonucleoside is uridine.

8. The method as claimed in claim 1, wherein the phenol is m-cresol.

9. The method as claimed in claim 1, wherein the phenol is o-chlorophenol.

10. The method as claimed in claim 1, wherein the phenol is m-xylenol.

11. The method as claimed in claim 1, wherein the phenol is phenol.

12. The method as claimed in claim 1, wherein the phosphorylating agent is pyrophosphoryl tetrachloride.

13. The method as claimed in claim 1, wherein the phosphorylating agent is phosphorus oxychloride.

14. The method as claimed in claim 1, wherein the phosphorylating agent is hydrolyzed phosphorus oxychloride.

15. The method as claimed in claim 1, wherein the phosphorylating agent is alcoholyzed phosphorus oxychloride prepared by mixing phosphorus oxychloride and a lower alcohol having 1 to 4 carbon atoms.

16. The method as claimed in claim 1, wherein the molar ratio of phosphorylating agent to ribonucleoside is about 1 to about 30.

17. In a method for direct phosphorylation of a ribonucleoside, the improvement wherein the ribonucleoside is in intimate admixture with a phenol, whereby only the OH group at the 5'-position of said rebonucleoside is selectively phosphorylated, the molar proportion of phenol to ribonucleoside being about 10 to about 100.

References Cited
UNITED STATES PATENTS

| | | | |
|---|---|---|---|
| 2,970,139 | 1/1961 | Duschinsky et al. | 260—211.5 |
| 3,201,388 | 8/1965 | Tsuchiya et al. | 260—211.5 |
| 3,290,285 | 12/1966 | Senoo et al. | 260—211.5 |

LEWIS GOTTS, *Primary Examiner.*

J. R. BROWN, *Assistant Examiner.*